July 28, 1953     A. KEPES     2,646,696

TRANSMISSION

Filed Dec. 14, 1948     3 Sheets-Sheet 1

INVENTOR.
ANDRE KEPES

BY

Dale A. Bauer
ATTORNEY

July 28, 1953     A. KEPES     2,646,696

TRANSMISSION

Filed Dec. 14, 1948     3 Sheets-Sheet 2

INVENTOR.
ANDRE KEPES
BY
Dale A. Bauer
ATTORNEY

July 28, 1953  A. KEPES  2,646,696
TRANSMISSION

Filed Dec. 14, 1948  3 Sheets-Sheet 3

INVENTOR.
ANDRE KEPES
BY
Dale A. Bauer
ATTORNEY

Patented July 28, 1953

2,646,696

UNITED STATES PATENT OFFICE 2,646,696

TRANSMISSION

André Kepes, Saint-Mande, France, assignor to Societe Anonyme des Manufactures des Glaces et Produits Chimiques de Saint-Gobain, Chauny & Cirey, Paris, France Application December 14, 1948, Serial No. 65,110
In France September 2, 1948

4 Claims. (Cl. 74—691)

This invention relates to transmissions which are designed to effect a variation in the speed or the power of a driven shaft with respect to a driving shaft. The transmissions that are best known are those employed in automobiles but it is to be understood that this invention is applicable to any situation where a speed change is to be effected between a driving and a driven shaft. The invention particularly relates to a transmission in which the change in speed between the driving and driven shaft may be made during operation without the intervention of a clutch and without interrupting continuous delivery of power to the driven shaft.

The variable transmissions of the prior art have generally been very limited in the range of speeds that could be selected, so that when it was desired to obtain speeds very different from that of the driving shaft it was necessary to employ an over drive or a reduction gear in addition to the transmission. It is the object of this invention to make a transmission having a driving and a driven shaft in which the speed of the driven shaft may be varied at will without interrupting the transmission of power. Another object of the invention is to make a transmission in which the speed variation shall be a linear function of the speed of the speed changing element of the transmission.

Another object of the invention is to perfect a mechanical motion, capable of transmitting power and of changing speed, in which two relatively rotatable members are provided with circular driving faces between which motion is transmitted by dirigible idlers. Another object of the invention is to combine a mechanical motion of the kind described with a differential drive.

From one point of view the apparatus of the invention may be regarded as a combination of a speed changing gear and a driving differential which are so combined that one of the elements of the differential rotates with the driving shaft and a second element of the differential is driven by the variable unit of the transmission, the movement imparted to the third part of the differential and to the driven shaft being the resultant of these two motions.

The novelty of the invention will be appreciated by reference to the figures of the drawing.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for that latter purpose being had primarily to the appended claims.

In the drawings wherein like reference characters refer to like parts throughout the several views.

Figure 5:
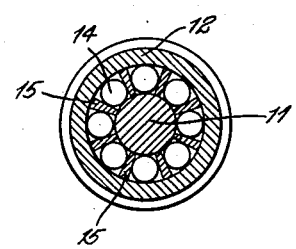
Figure 5 is a reduced scale section on the line 5—5 of Figure 3.

The numeral 10 indicates the shaft through which power is brought into transmission, having a conical head 11 constituting the sun element of a driving differential of unique design, the second element of which is the outer planetary member or race 12 which is free to rotate with respect to shaft 10 and is provided with a conical seat 13 of angularity different from that of head 11. Between the two conical seats of this differential are conical rollers 14 (see Fig. 5) which are separated by fingers or prongs 15 which project from a disk 16 on the end of a driven shaft 17.

Fixed on the shaft 10 is a rotatable plate 20 of circular shape having a face 21 facing the similar face 22 of plate 12. In the adjacent faces 21 and 22 are formed circular grooves 23 and 24 which are also circular in section and of identical radius. Thus the outlines of the grooves made by passing a plane radially through the plates, as in Fig. 1, constitute arcs of the same circle.

Motion is transmitted from plate 20 to plate 12 through dirigible, idler rollers or wheels 25 of which there are preferably three spaced 120° apart. These rollers are pivotally mounted on axes tangent to the circle constituting the axis of the grooves 23—24, consequently the edges of the rollers 25 will bear on the circular walls of the grooves in any position within the radial angles subtended by the grooves, and communicate the motion of plate 20 to the race 12 of the differential. Thus the motion of plate 20 is transmitted to plate 12, and the motion of rollers 14 becomes the resultant of the motions of cone 11 and cone 13, both of which are driven wheneven power is applied to the shaft 10.

Figures 7, 8:
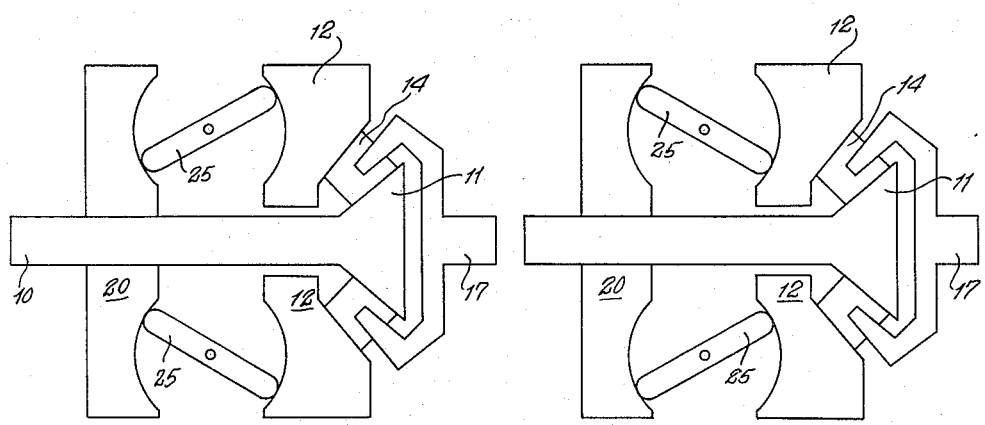
Figure 7 is a diagrammatic view of a transmission of the type of Figure 1 with the dirigible rollers acting to decrease the speed of the driven shaft.
Figure 8 is a diagrammatic view of the same apparatus with the dirigible rollers in position to act as a speed gear or overdrive.

Variation in speed is achieved by simultaneously and identically pivoting the rollers 25 about their axes. Thus, when they are moved to the position shown in Fig. 7 the drive is from a lesser radius on plate 20 to a greater on plate 12 and a speed reduction occurs, while in the position of Fig. 8 the drive is from a greater radius to a lesser so that plate 12 is driven at a higher speed than 20.

Inasmuch as there is rolling friction between the walls of the grooves and the circumference of the rollers 25 whenever the transmission is operated it is possible to change the position of the rollers and thus to change speed without interrupting the delivery of power simply by pivoting the rollers 25 about their axes.

Figure 2:
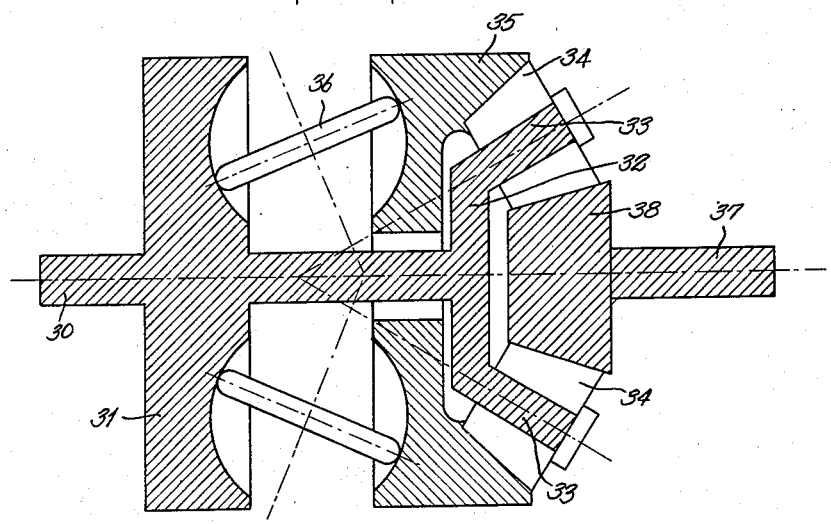
Figure 2 is a diagrammatic, vertical, sectional view of an alternate form of the apparatus, exclusively useful as an overdrive.

In the modification of the invention shown in Fig. 2 a drive shaft 30 provided with a plate 31 similar to plate 20 has at its end a disc 32 from which project fingers 33 which are received between the rollers 34. The plate 35 is driven by the rollers 36 and a driven shaft 37 receives its impulse from a conical end 38 which bears against the rollers 34. The cone 38 is rotated at a speed which is a differential of the speeds of elements 33 and 35.

In the forms of the invention thus far described the driving and driven shaft have aligned axes and the axis of the fingers 15—35 meet upon the axis of those shafts. Perpendiculars to the planes of rollers 25 and 36 passing through the centers of the rollers also meet at the axis of the two shafts. Furthermore the axis of the rollers 14—34 meet upon the axis of the shafts and the plates 20 and 12 have the same axis. Therefore, it appears in a real sense that the entire apparatus is coaxial.

In the forms in which the invention is herein set forth the drive between the plates is of friction type. Nevertheless its efficiency is high and its variability is almost infinite, it being possible to make the most minute adjustment in the relative speeds of driving and driven shafts. The motion of the idler rollers 25 and 36 is not illustrated in Figs. 1 and 2 but they shift about their pivots simultaneously and equally. It will be realized that if, in one position of the rollers 25, the motion of plate 12 being counter-clockwise the general motion imparted to the shaft 17 by fingers 15 will be clockwise or counterclockwise according as the resultant or differential of the motions of parts 11 and 12 is clockwise or counterclockwise, and that the speed imparted to the driven shaft 17 will depend on the relative speeds imposed upon rollers 14 by the selected position of the dirigible rollers 25.

Figure 3:
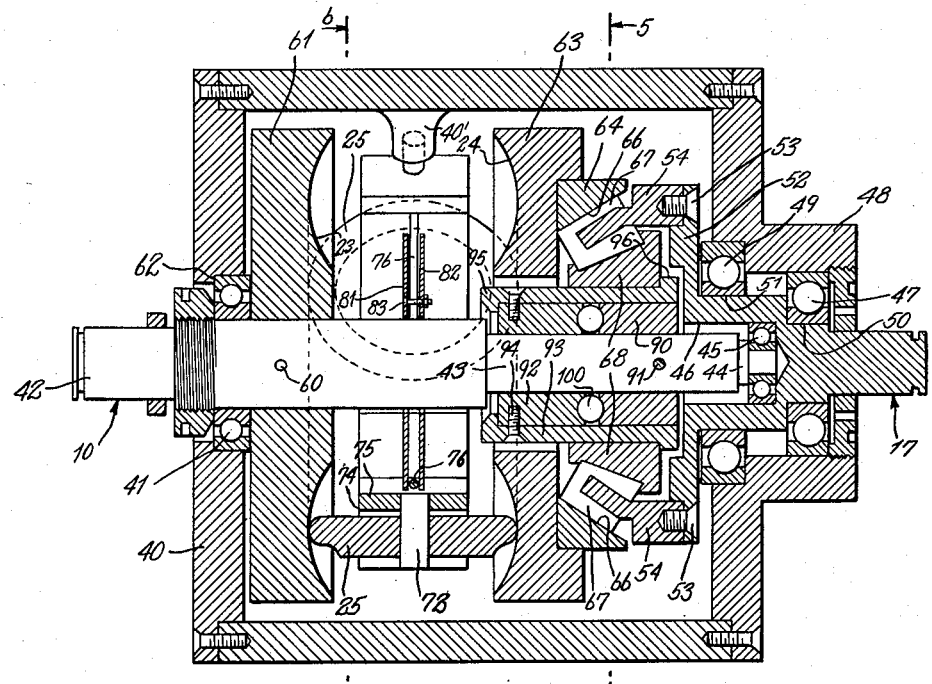
Figure 3 is a vertical, sectional view through an apparatus of the type of Figure 1 with the parts shown in greater detail.
Figure 4:
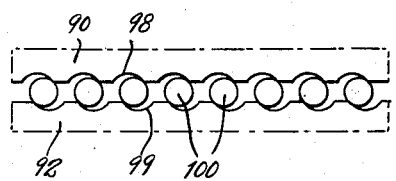
Figure 4 is a schematic view of the pressure clutch.
Figure 6:
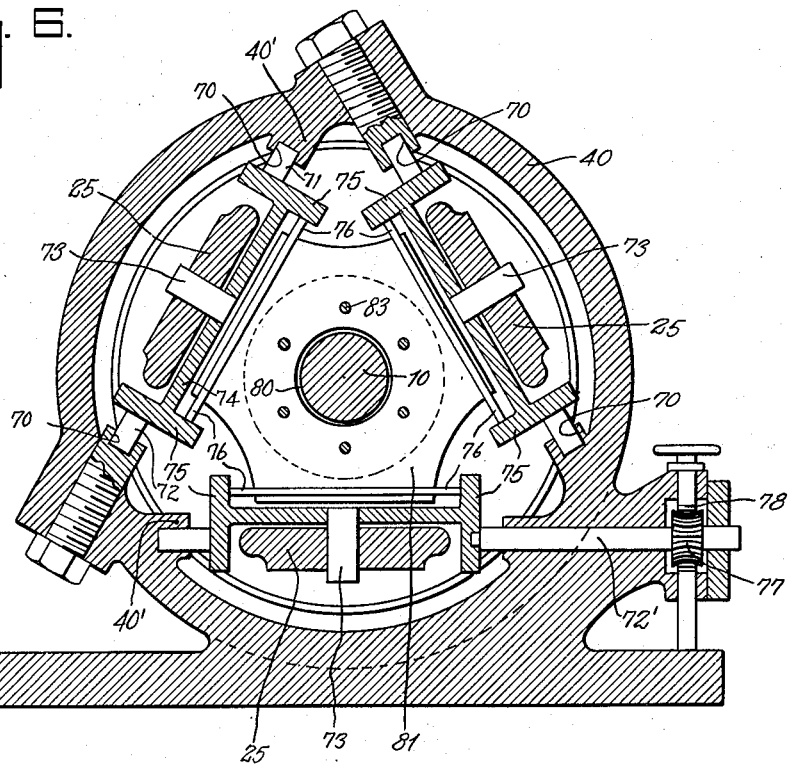
Figure 6 is a section on the line 6—6 of Figure 3.

Referring now mainly to Figs. 3 and 6 wherein there is shown some of the constructional detail of the device the numeral 10 indicates generally the drive shaft, and 17 the driven shaft. The drive shaft is rotatably mounted in a metallic box or casing 40 by means of ball bearings 41 and end 42 of the shaft projects from the casing and serves as an attachment for a pulley, gear or the like, for the transmission of power from a driven source. The other end of the shaft is reduced at 43 and further reduced at 44, the portion 44 being mounted in a ball bearing 45 within a cylindrical recess 46 in the end of shaft 17, which is axially aligned with shaft 10 and is supported by bearings 47—49 in a cylindrical extension 48 on the case. The shaft 17 projects from the casing and serves for the transmission of power to some outside mechanism, but within the casing it is twice enlarged, at 50 and at 51, to furnish bearing surfaces for the bearings 47—49 and to provide interior room for the reception of the end of shaft 10. A disc 52 is carried by the shaft 17, and in the form shown, is integral therewith. Attached to this disc by screws 53 are fingers 54 projecting between the rollers of the differential and serving for the transmission of power.

Figure 1:
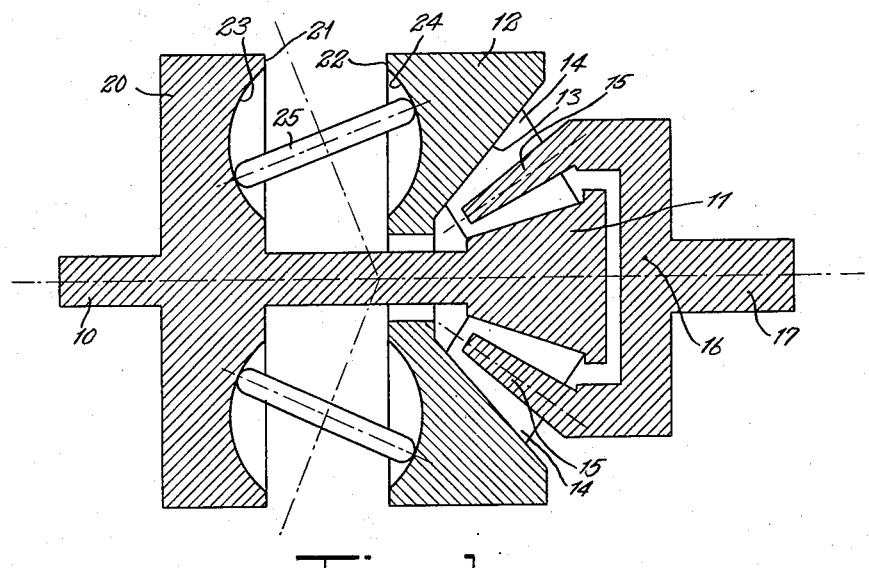
Figure 1 is a diagrammatic, vertical, sectional view of a form of the apparatus particularly but not exclusively useful as a reduction gear.

Fixedly attached to the shaft 10, for instance by a key, or pin 60, is a plate 61 which corresponds to plate 20 of Fig. 1, having a circular groove of circular cross section. This plate bears against the side of bearing 41 which in turn bears against the abutment 62 in the case thus preventing the shaft from being moved axially in that direction. A cooperating disc 63 is fixed to the outer planetary member or race 64 of the differential. This race has an inner conical face 66 which is supported by the planetary rollers 67 of the differential, which are in turn supported by the inner sun member or race 68 which is fixed to rotate with the shaft 10.

The plate 63 is driven by plate 61 through idler rollers 25 of which there are three, spaced equally about the shaft 10. These rollers are pivotally mounted in the casing 40 as indicated in Fig. 6, wherein supports 40' project from the wall and are provided with bearings 70 which receive trunnions 71—72, the axes of which are in the plane through the rollers 25. The axle 73 is carried in the support 74, which is mounted on the plates 75 to which the trunnions 71—72 are attached.

In order that the position of the rollers 25 may be changed simultaneously to maintain an identical driving relationship, rods 76 also connect the plates 75 parallel to supports 74. A trunnion 72' is extended through the casing and carries a gear 77 which can be turned by a worm 78 operated from a convenient position. A pair of hexagonal plates 81—82 are connected together by bolts 83, clasping the rods 76 between alternate pairs of extremities, as shown in Figs. 3 and 6. By means of this construction identical motion is imparted to all rollers by means of the single worm 78, inasmuch as the angular relation of rods 76 is sufficient to prevent turning torque from jamming the edge of hole 80 against the rotating shaft 10. This structure is a parallel motion means because it keeps the cranks on which the rollers are mounted in like relationship on the faces of the plates. The rods 76 are triangularly arranged, and constitute parts of a single geometrical figure.

In the form of the invention which is being described, a frictional drive is maintained by means of pressure which is automatically applied to the driven parts by the apparatus. This is accomplished by a mechanism including a collar 90 which is fixed to shaft 10 by pin 91. Another collar 92 is axially movable upon the shaft but is fixedly attached to a sleeve 93 by means of pins 94. The sleeve 93 has a flange 95, which overlaps the collar 92, and extends over and is axially movable with respect to the sleeve 90. It is also provided with a flange 96 which bears against the side of differential race 68. The differential race 68 is grooved, overlapping the rollers 67 at both ends, so that the roller is made to act as a thrust bearing.

The adjacent faces of collars 90—92 are provided with spaced, shallow grooves 98—99, and roller ball bearings 100 are positioned between these grooves. The amount of play in the parts of the apparatus is insufficient to allow the rollers to escape from the grooves from which they are seated, but sufficient play is allowed to permit the rollers to exert a camming action against the ends of the grooves as the turning torque is applied to shaft 10. Thus, as shaft 10 is turned the collar 90 is turned forcing the rollers 100 partially out of their grooves 98—99 so that by the camming action the collar 92 is moved along the shaft. This collar bears against the flange 95 of the sleeve 93, of which the flange 96 bears against the differential race 68 which transmits its thrust to rollers 67, race 64, the plate 63, the roller 25, the plate 61, and the bearing 41, which bears against the abutment 62. Thus, when the apparatus is operated, frictional pressure is applied to all the driven parts, assuring the highest efficiency.

It is possible to find a position of the dirigible rollers where no power is transmitted to the driven shaft and it remains motionless. For positions of the rollers situated on one side or the other of this neutral position there are positions which produce motion of the driven shaft in advance or reverse. It is thus possible to pass continuously to advance or reverse by moving through the neutral position of the rollers.

It is to be noticed that regardless of the reversal, the pressures that are exerted on the rollers by the movable plate are in one direction so that an unidirectional and moderate application of pressure on the rollers suffices to allow the apparatus to perform its function without lost motion. Conical rollers have been disclosed in the differential, but it is also possible to utilize roller bearings, particularly of the type that are capable of sustaining an axial load, such as conical aligned cylinders, or balls.

The dirigible rollers drive by friction, but otherwise the invention is not limited to friction drives, although friction drive recommends itself for its efficiency and silence. Gears are equally useful in the plain differential. In particular, if it is desired to receive upon the driven shaft a thrust of material proportion, epicycloidal differentials having conical or cylindrical bearings are recommended.

This invention includes an apparatus that permits speed change between shafts in a continuous way without interrupting the flow of power. It also includes an apparatus for driving and changing speed which might be regarded as two combined differentials having a common planetary member and axially aligned suns. The invention also includes the concept of a change speed gear involving circular grooves in the adjacent faces of rotating members, change of speed and reversal being accomplished by dirigible rotors that transmit power from one planetary member to another, in combination with a differential. In this invention the toroid and the differential are mounted as a unit on a single shaft between elements fixed to the shaft, and the second shaft is connected to that mechanism only by a simple power input or takeoff. Thus, in Fig. 3 the torus ring 61 is fixed to the shaft and the cam sleeve 90 is fixed to the shaft and the entire thrust of the cam ball bearing 100 is borne by the shaft. No thrust is borne by the frame of the machine, which serves only to mount the shafts. The differential and toroid speed changer have races 63—64 in common in that they rotate together and are fixed with respect to each other, and these races are suspended about the shaft, not mounted directly on it. Thus, in Fig. 3, it can be seen that the rings 63 and 64 are not mounted directly on the shaft by roller bearings or the like but are suspended over or around it by rollers 67 and race 68 which are mounted on the shaft by intermediate means. In the structure the pins 50 and 91 are spaced thrust resisting and driving members between which the unit composed of the toroidal speed changer and differential are mounted. The elements 90, 92, 93, 100 constitute a cam drive coupling. The toroid, the differential, and the coupling may be considered as connected in series.

A particular advantage of the invention is its simplicity and its almost infinite variability. Another advantage is the ability to change speed without interrupting the flow of power.

It is possible to demonstrate that both forms of the invention described herein produce an apparatus in which the speed of the driven shaft is a linear function of the variable element in the speed change gear.

Let $w$ be the angular speed of the driving shaft, $w'$ be the variable angular speed of the speed changing element, and $w''$ the angular speed of the driven shaft of the apparatus, $w$ being presumed to be positive and $w'$ and $w''$ being positive or negative according to whether they are in the same direction or reverse to $w$. Let $R$ and $r$ be the radii of the respective circumferences at which a single point of the surface of a roller engages that of the two plates and simple calculation shows that in the case of Fig. 1 the relation is:

$$(1) \qquad w''=w\frac{1+\dfrac{w'R}{wr}}{1+\dfrac{R}{r}}$$

and in the case of Fig. 2:

$$(2) \qquad w''=w\left(1+\frac{R}{r}-\frac{w'R}{wr}\right)$$

These two expressions of $w''$ are linear functions of $w'$ having for parameters $w$ and the relation $$\frac{R}{r}$$

In practical application a transmission of the type of Fig. 1, acting throughout its range as a speed reduction gear with its driving sun at 1450 R. P. M. produced speeds of the driven shaft ranging from 250 R. P. M. in the same direction as the driving sun to 1350 R. P. M. in reverse, speed being reduced and reversal and acceleration accomplished by imperceptible degrees passing through a neutral position that produced no motion in the driven shaft. This is a single example, and other machines would have the very widest difference in performance depending on structure and also on the proportion of parts.

As many apparently widely different embodiments of the present invention may be made without departing from the spirit and scope thereon, it is to be understood that the invention is not limited to the specific embodiments.

I claim:

1. A variable speed transmission having a rotatable shaft, a toroid race affixed thereto, dirigible power transmitting rollers mounted in contact with said race, a toroid race in contact with said rollers, a differential associated with said shaft, a said toroid race being mounted upon a race of said differential for angular motion about said shaft, conical, angularly spaced rollers supporting said differential race, a differential race engaging said rollers, a driving sleeve fixed to said differential and having a bearing mounted upon said shaft for angular and axial motion with respect thereto, a driving sleeve fixed to said shaft, outwardly of said bearing, said bearing and sleeve having opposed faces with opposed cam depressions, balls engaged in said depressions, and power transmitting means engaged with the rollers of said differential.

2. A variable speed transmission having a shaft, a collar affixed to said shaft, a bearing mounted for angular and axial movement on said shaft adjacent said collar, said bearing and collar having cooperating parts comprising a cam transmission, a differential having conical roller bearings and having a race fixed to said bearing, a toroidal speed changer having a race fixed to said shaft and a race spaced from said shaft supported by said differential, and transmission means engaged with said conical roller bearings.

3. A variable speed transmission having a pair of aligned shafts, a roller bearing, driving means connecting the rollers of said bearing to one said shaft, said bearing having a plurality of races engaging said rollers, means to drive one race comprising a sleeve fixed within the race having a flange bearing on the end of the race, a sleeve fixed within said sleeve and rotatably mounted on the other shaft, a second sleeve within said sleeve fixed to said other shaft, said sleeves having cooperating cam faces engaging rollers and comprising a transmission operable to drive and to apply axially directed pressure to the race of said bearing, and driving means for the other said race comprising a toroidal speed changer having one toroid race fixed to the said other shaft and its other toroid race fixed to the said other race of said bearing.

4. A variable speed transmission having a casing, a first shaft extending through a wall of the casing, a toroidal speed changer having a race fixed to the shaft, a thrust bearing mounted in said wall supporting the shaft, a second shaft mounted in the opposite wall of said casing, said shafts having their inner ends in mutually supporting relation, a cam drive having one cam means fixed to said first shaft and another cam means angularly and longitudinally movable on said shaft toward said toroidal speed changer, a sleeve, encircling said cam drive, fixed to said another cam means and angularly and longitudinally movable on said one cam means, a differential of thrust transmitting type having one race associated in thrust transmitting relation with said sleeve and having another race associated with a race of said toroidal speed changer.

ANDRÉ KEPES.

References Cited in the file of this patent

UNITED STATES PATENTS

| Number | Name | Date |
|---|---|---|
| 1,024,742 | Nettenstrom | Apr. 30, 1912 |
| 1,399,442 | Rennerfeldt | Dec. 6, 1921 |
| 1,425,172 | Cameron et al. | Aug. 8, 1922 |
| 1,774,175 | Erban | Aug. 26, 1930 |
| 1,833,475 | Standish | Nov. 24, 1931 |
| 1,999,544 | Madle | Apr. 30, 1935 |
| 2,060,884 | Madle | Nov. 17, 1936 |
| 2,086,491 | Dodge | July 6, 1937 |
| 2,097,631 | Madle | Nov. 2, 1937 |
| 2,100,632 | Chilton | Nov. 30, 1937 |
| 2,152,796 | Erban | Apr. 4, 1939 |

FOREIGN PATENTS

| Number | Country | Date |
|---|---|---|
| 925,316 | France | Mar. 24, 1949 |
| 376,760 | Italy | Nov. 24, 1939 |